(12) United States Patent
Jones et al.

(10) Patent No.: US 8,402,837 B1
(45) Date of Patent: Mar. 26, 2013

(54) SYSTEM FOR FIELD TESTING HELICAL PILES

(75) Inventors: Robert L. Jones, Golden, CO (US); Randy E. Kuzio, Lone Tree, CO (US)

(73) Assignee: International Marketing & Research, Inc., Wheat Ridge, CO (US)

( * ) Notice: Subject to any disclaimer, the term of this patent is extended or adjusted under 35 U.S.C. 154(b) by 0 days.

(21) Appl. No.: 13/306,450

(22) Filed: Nov. 29, 2011

(51) Int. Cl.
*G01N 3/00* (2006.01)
(52) U.S. Cl. .......................................... 73/788
(58) Field of Classification Search .................. 73/788
See application file for complete search history.

(56) References Cited

U.S. PATENT DOCUMENTS

| | | | |
|---|---|---|---|
| 2,674,876 A | | 4/1954 | Caudill |
| 3,546,885 A | * | 12/1970 | Pogonowski ............... 405/227 |
| 3,939,570 A | | 2/1976 | Loftus |
| 3,946,601 A | | 3/1976 | Yizhaki |
| 3,950,954 A | | 4/1976 | Haug |
| 4,043,133 A | * | 8/1977 | Yegge .......................... 405/239 |
| 4,081,992 A | | 4/1978 | Aurora et al. |
| 5,176,472 A | | 1/1993 | Kinder |
| 5,234,290 A | | 8/1993 | Collins |
| 5,608,169 A | * | 3/1997 | Fujioka et al. ................ 73/803 |
| 6,311,567 B1 | | 11/2001 | England |
| 6,352,391 B1 | | 3/2002 | Jones |
| 6,363,776 B1 | | 4/2002 | Reinert |
| 6,682,267 B1 | | 1/2004 | Jones |
| 6,782,069 B1 | | 8/2004 | Kang et al. |
| 6,817,810 B2 | | 11/2004 | Jones |
| 7,037,045 B2 | | 5/2006 | Jones |
| 7,175,368 B2 | | 2/2007 | Stotzer |
| 7,347,103 B2 | | 3/2008 | Reinert |
| 7,353,714 B2 | | 4/2008 | England et al. |
| 2002/0095976 A1 | | 7/2002 | Reinert |

FOREIGN PATENT DOCUMENTS

| | | |
|---|---|---|
| DE | 3424776 A1 | 1/1986 |
| JP | 57092211 A | 6/1982 |
| JP | 60031030 A | 2/1985 |
| JP | 61250219 A | 11/1986 |
| JP | 1169332 A | 7/1989 |

\* cited by examiner

*Primary Examiner* — Lisa Caputo
*Assistant Examiner* — Octavia Davis-Hollington
(74) *Attorney, Agent, or Firm* — Dorr, Carson & Birney, P.C.

(57) ABSTRACT

A system for field testing the bearing behavior of a test helical pile employs a plurality of anchor helical piles driven into the ground at angles around the test helical pile and a head assembly to form a support structure over the test pile. The head assembly includes attachments for engaging the upper ends of the anchor helical piles, and a vertical passageway extending through the head assembly. A hollow-core hydraulic jack having a vertical passageway is inserted between the upper end of the test helical pile and the head assembly to exert a test load on the test helical pile. A vertical member is placed through the vertical passageways in the head assembly and jack to the upper end of the test helical pile to measure movement of the test helical pile in response to the test load.

11 Claims, 4 Drawing Sheets

SYSTEM FOR FIELD TESTING HELICAL PILES

BACKGROUND OF THE INVENTION

1. Field of the Invention

The present invention relates generally to the field of helical piles. More specifically, the present invention discloses a system for field testing the bearing behavior of helical piles.

2. Statement of the Problem

Helical piles have been used for many years in a variety of applications. For example, helical piles are widely used to lift and stabilize structures, and also in new construction. In these applications, helical piles are often called upon to carry large compressive loads. Helical piles are also used to anchor structures, such as large antennas or pylons for high voltage lines, that are subject to large wind loads. Helical piles are also employed for lateral earth retention and shoring. In these fields, helical piles are often required to carry large tensile loads. For the purposes of this patent application, the terms "helical pile" and "helical pier" are used interchangeably.

Conventional helical piles have an elongated shaft with a substantially square cross-section. The shaft can either be solid or tubular. One or more helical bearing plates are permanently attached to the shaft adjacent to its lower end. The length of the shaft is fixed, as are the diameter and location of the helical plate. Examples of modular helical piering systems include the Applicant's U.S. Pat. Nos. 6,352,391, 6,682,267 7,037,045 and 6,817,810.

The helical pile is typically screwed into the ground by a power drive head that engages the upper end of the shaft and applies torque that is carried by the shaft to the helical plate. An axial force is also applied to the shaft of the helical pile. Helical piles are typically screwed into the ground to a point at which a predetermined torque limit is reached. However, it is sometimes difficult to predict the load bearing behavior of a helical pile, in tension or compression, due primarily to the unpredictable nature of soil conditions. Therefore, many jobs require field testing of the load bearing behavior of helical piles after the piles have been driven into the ground, but before subsequent phases of the job continue.

One conventional approach requires a very large weight (i.e., several tons) that is applied to the exposed head of the pile. The resulting deflections of the pile are then measured. This approach has obvious shortcomings in terms of transportation costs, space requirements and safety associated with using a large weight.

Other conventional testing techniques apply a smaller dynamic load (e.g. a small weight that impacts the head of the pile, or an explosive force) to create transient deflections in the pile that can be monitored and measured. However, these testing techniques typically require sophisticated instruments and highly-skilled technicians to interpret such data.

Another conventional approach employs a load beam held by a series of anchor piles driven into the ground. A jack is placed between the load beam and the head of the test pile to exert a test load on the test pile. The resulting reactive load is carried by the load beam and the anchor piles.

U.S. Pat. No. 7,175,368 (Stötzer) discloses a test setup for determining the bearing behavior of a displacement pile that employs a plurality of angled anchor piles to create a support structure. An hydraulic pressing device is placed between the loading device at the apex of the support structure and the test pile. However, this system does not appear to specify any particular means for measuring deflection of the test pile.

Thus, a need continues to exist in the industry for a testing system that can be readily transported and assembled in the field, and that does not require highly-skilled technicians for operation. In particular, the testing system should provide a means for directly measuring movement of the test pile under the test load.

3. Solution to the Problem

The present invention addresses these concerns by providing a testing system for helical piles that uses a set of angled anchor piles to support a head assembly with a vertical passageway aligned above the test pile. A hollow-core hydraulic jack is mounted between the upper end of the test pile and the head assembly to exert a test load on the test pile. A vertical member can be inserted through the vertical passageways of the head assembly and hollow-core hydraulic jack to allow direct measurement of the resulting movement of the test pile.

It should also be noted that the present testing system eliminates the need to transport heavy loads to the job site to test installation of helical piles. In particular, the present invention requires only components that can be readily transported to a job site and quickly assembled by one or two workmen.

SUMMARY OF THE INVENTION

This invention provides a system for field testing the bearing behavior of a test helical pile. The system employs a plurality of anchor helical piles driven into the ground at angles around the test helical pile and a head assembly to form a support structure over the test pile. The head assembly includes attachments for engaging the upper ends of the anchor helical piles, and a vertical passageway extending through the head assembly. A hollow-core hydraulic jack having a vertical passageway is inserted between the upper end of the test helical pile and the head assembly to exert a test load on the test helical pile. A vertical member is placed through the vertical passageways in the head assembly and jack to the upper end of the test helical pile to measure movement of the test helical pile in response to the test load.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
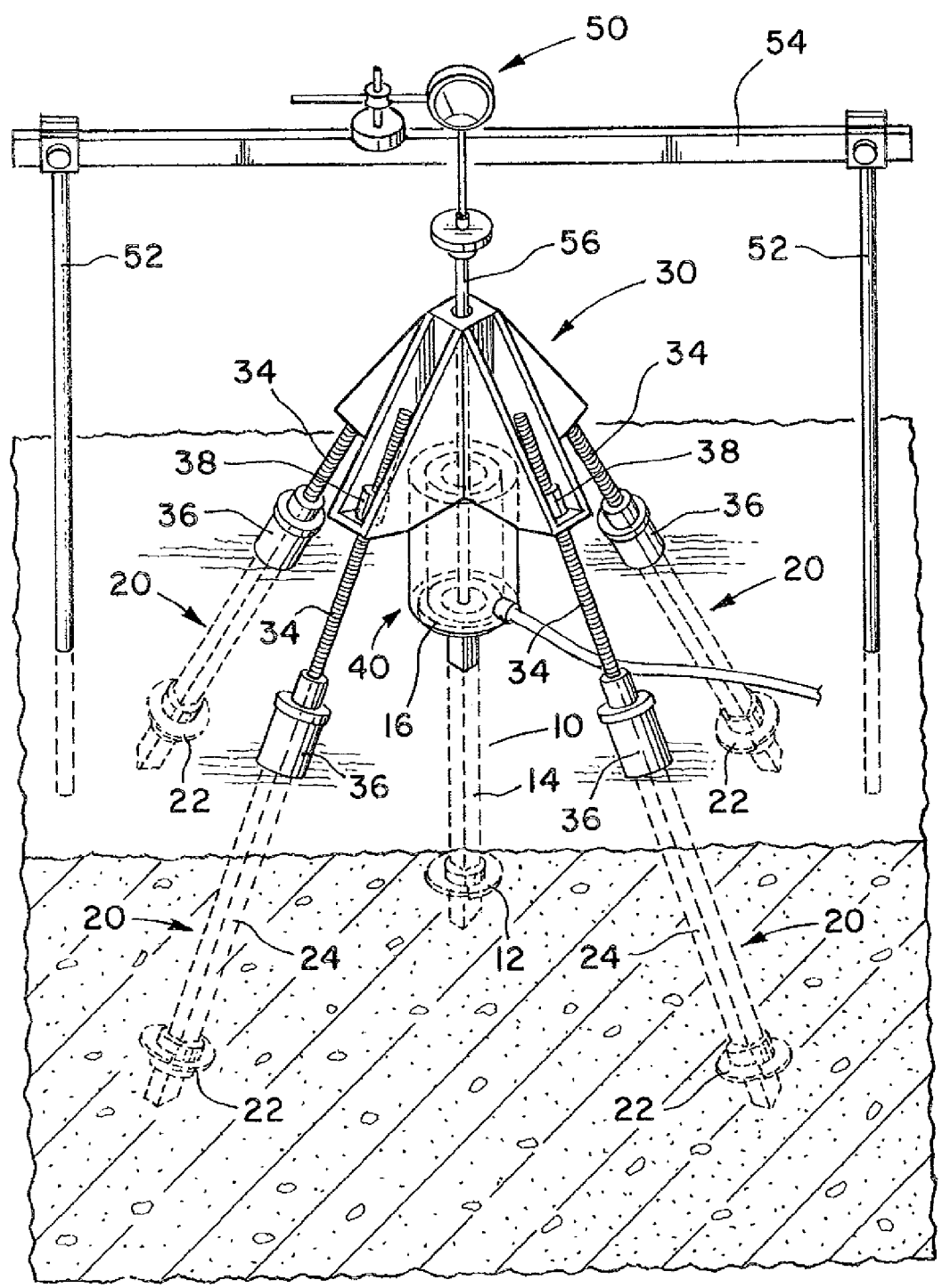
FIG. 1 is a perspective view of an embodiment of the present invention.

Turning to FIG. 1, a perspective view is shown of an embodiment of the present invention. A head assembly 30 supported above the upper end of the test pile 10 by a series of anchor piles 20 driven into the ground at angles around the test pile 10. A hollow-core hydraulic jack 40 is placed between the upper end of the test pile 10 and the bottom of the head assembly 30.

The test pile 10 is typically a conventional helical pile with an elongated shaft 14 and at least one helical blade 12 near its lower end. The anchor piles 20 can also be helical piles having a shaft 24 with at least one helical blade 22 near the lower end. The upper ends of the anchor piles 20 can be threaded 26 to engage the threaded sockets 36 on the anchor piles, as will be discussed below. However, it should be understood that other types of piles capable of withstanding the required tensile loads could be substituted. These anchor piles 20 converge toward a region above the exposed upper end 16 of the test pile 10. It is preferred that at least three anchor piles 20 are employed for maximum stability. The anchor piles 20 and head assembly 30 form a tripod-like support structure centered over the test pile 10. Additional anchor piles 20 can used for additional support and load-bearing capacity.

Figure 4:
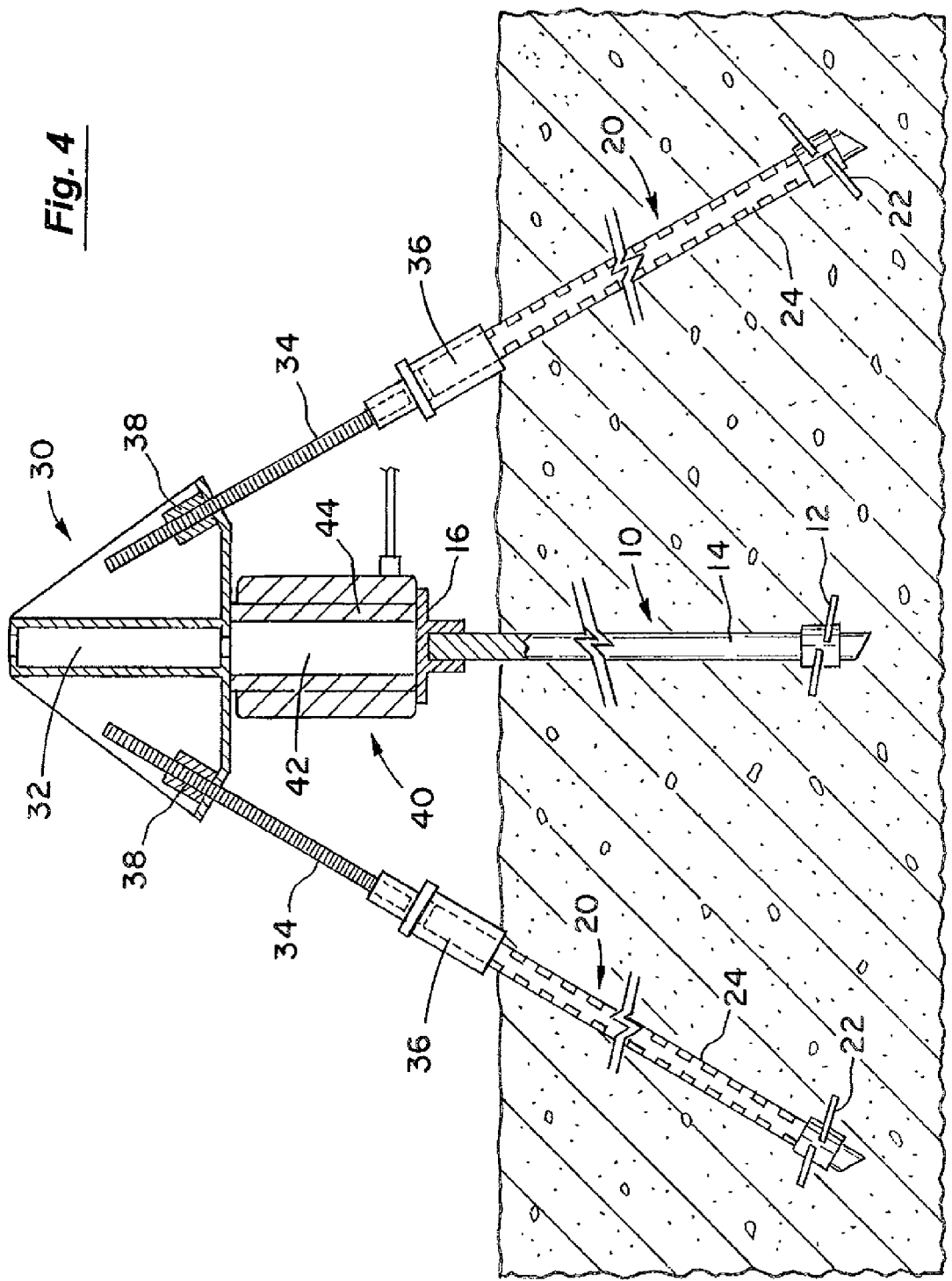
FIG. 4 is a vertical cross-sectional view corresponding to FIGS. 2 and 3 after the head assembly 30 has been attached to the anchor piles 20 and a hollow-core jack 40 has been positioned between the head assembly 30 and the test pile 10.
Figure 5:
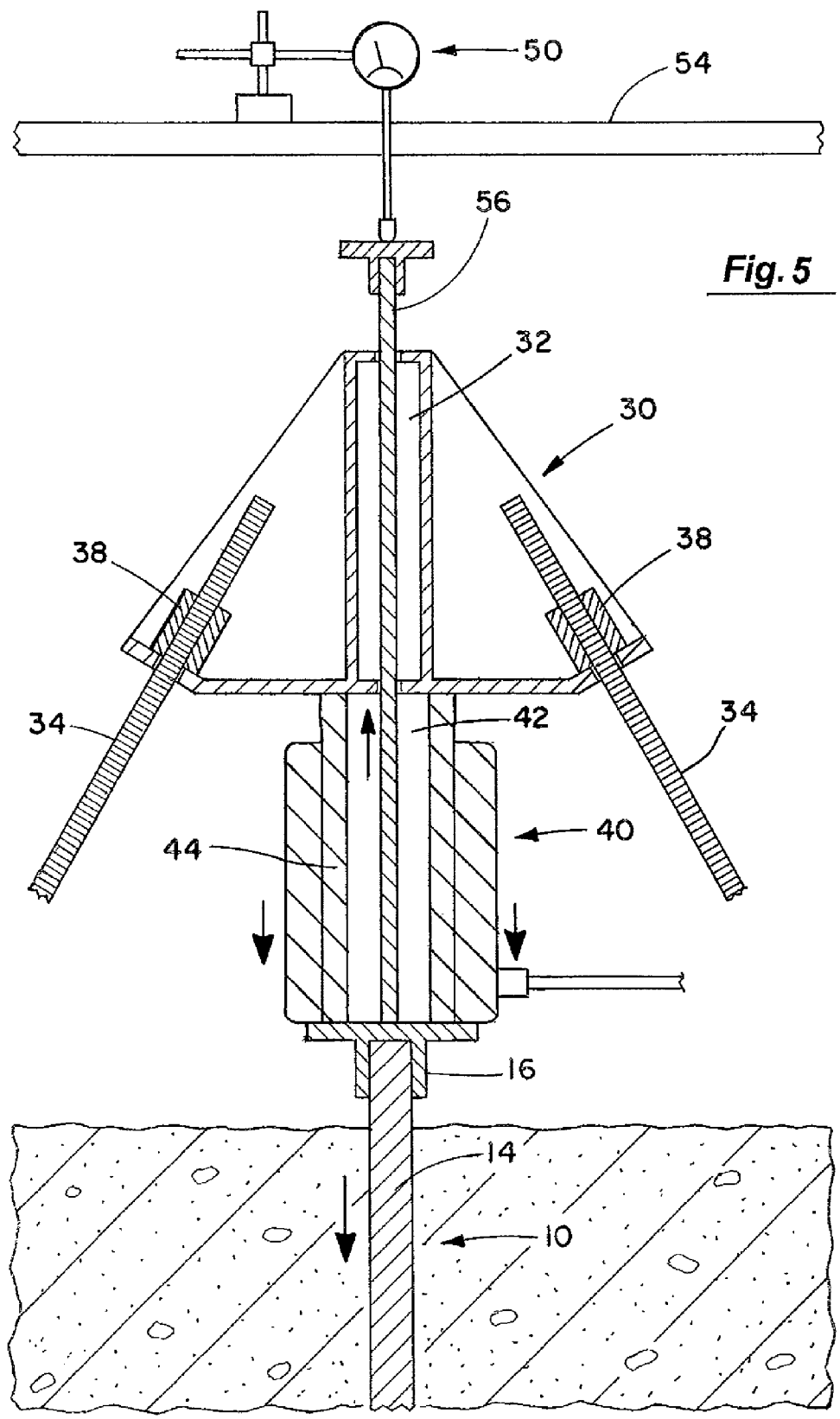
FIG. 5 is a vertical cross-sectional view corresponding to FIGS. 2-4 after the hollow-core jack 40 has exerted a test load on the helical pile 10.

A vertical passageway 32 runs completely through the central core of the head assembly 30, as shown in FIGS. 4 and 5. The head assembly 30 also has series of wing structures extending radially outward from its central core, as shown in FIG. 1, for attachment to each of the anchor piles 20. For each wing structure, a rod 34 runs radially outward and diagonally downward through the wing structure and terminates in a socket coupler 36 adapted to engage the upper end 26 of an anchor pile 20. In the embodiment shown in the accompanying drawings, both the socket couplers 36 and upper ends 26 of the anchor piles 20 are threaded to removably engage one another. In addition, the rods 34 can also be threaded to engage adjustment nuts 38 for facilitating adjustment of the positions of the socket couplers 36 to receive the anchor piles 20. Threads have the advantages of simplicity and the capacity to handle large tensile loads, but other types of engagement mechanisms and adjustment mechanisms for the rods 34 and socket couplers 36 could be substituted. Optionally, the head assembly 30 can also incorporate universal joints or spherical nut-and-socket mechanisms to provide additional adjustability in connecting the socket couplers 36 to the anchor piles 20.

A variety of hollow-core hydraulic jacks 40 are commercially available. In general terms, a hollow-core hydraulic jack 40 has a generally cylindrical outer housing and an inner hollow ram or hollow cylindrical piston 44 that slides axially relative to the outer housing when actuated by hydraulic pressure supplied via a hose to the jack 40 from an external source. In other words, the inner hollow ram 44 telescopes relative to the outer housing in response to pressure. A vertical passageway 42 extends axially along the inner hollow ram 44 from the top to the bottom of the jack 40.

When assembled, the vertical passageway 42 of the jack 40 is in vertical alignment with the vertical passageway 32 of the head assembly 30, and also in vertical alignment with the upper end of the test pile 10. This alignment allows a vertical member 56 to be inserted through the head assembly 30 and jack 40 into contact with the upper end of the test pile 10. A measurement device 50 can then directly measure movement of the test pile 10 (via the vertical member 56) in response to test loads exerted by the jack 40 on the test pile 10. Optionally, a horizontal reference beam 54 can be held across the vertical member 56 above the head assembly 30 to provide a frame of reference for measurement of vertical movement. This horizontal reference beam 54 can be supported between two support members 52 as shown in FIG. 1.

Figure 2:
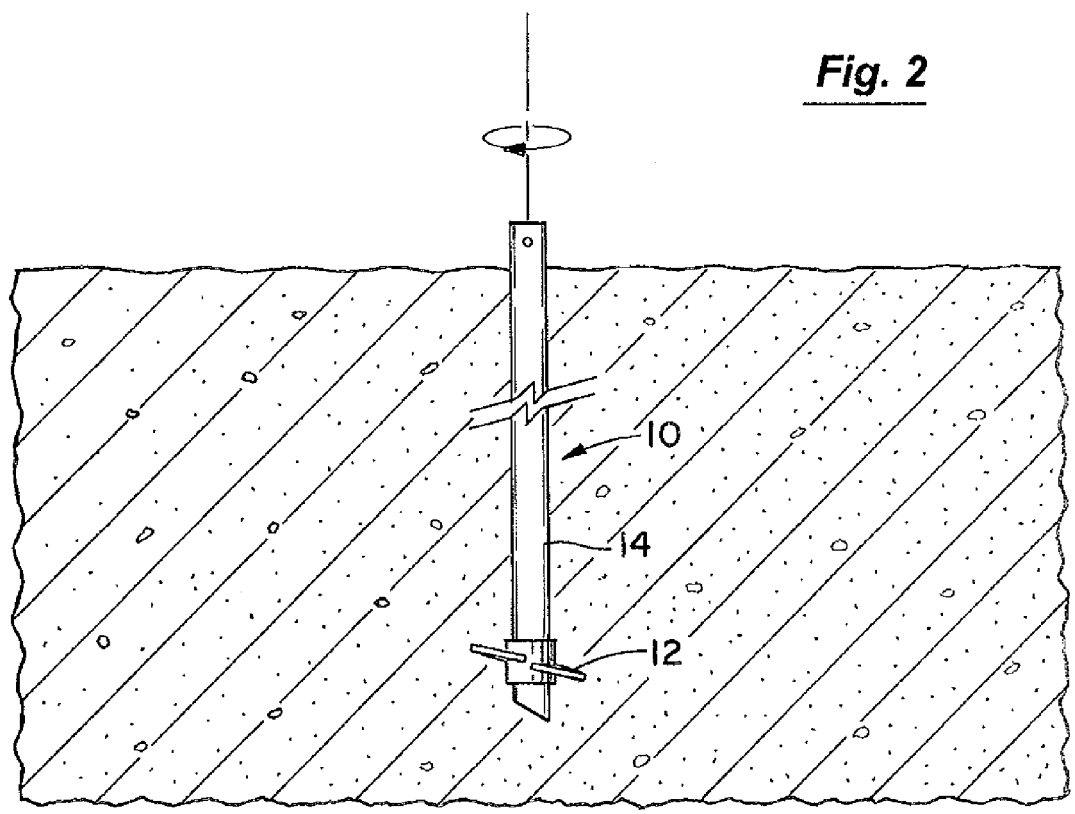
FIG. 2 is a vertical cross-sectional view of a helical pile 10 to be tested after it has been driven into the ground.
Figure 3:
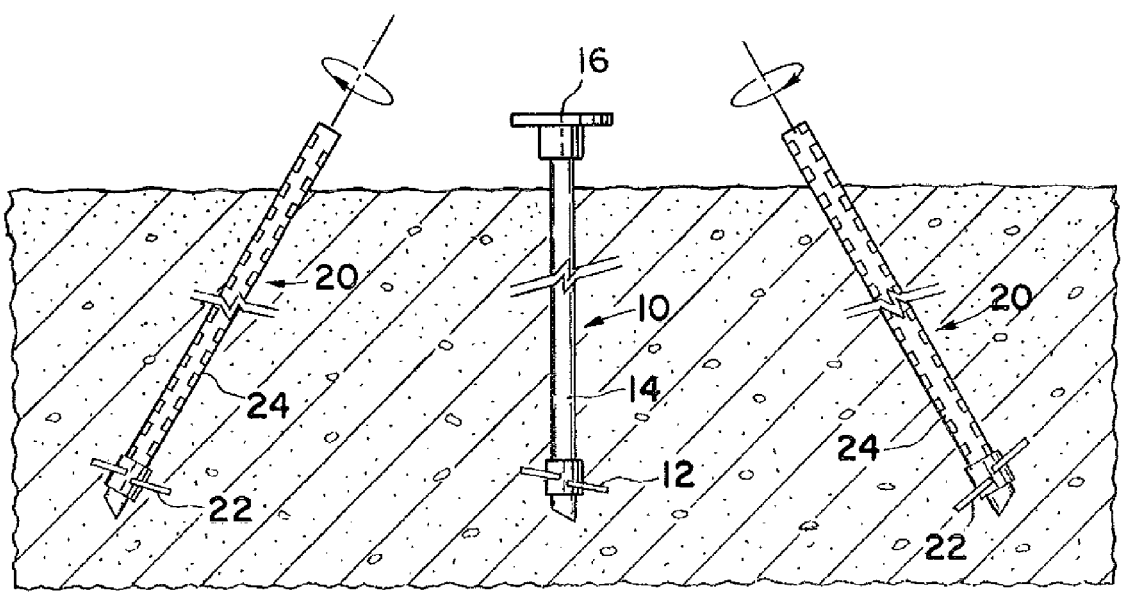
FIG. 3 is a vertical cross-sectional view corresponding to FIG. 2 after a series of anchor piles 20 have also been driven into the ground.

FIGS. 2-5 are vertical cross-sectional views depicts the steps in a method of use of the present pile testing system. First, a helical pile 10 to be tested is driven into the ground, as shown in FIG. 2. Next, a series of anchor piles 20 are driven into the ground at angles around the test pile 10, as illustrated in FIG. 3. FIG. 4 is a vertical cross-sectional view after the head assembly 30 has been attached to the anchor piles 20 and a hollow-core jack 40 has been positioned between the head assembly 30 and the test pile 10.

FIG. 5 is a vertical cross-sectional view after the vertical member 56 has been inserted through the head assembly 30 and hollow-core jack 40, the measurement device 50 has been assembled, and the jack 40 has exerted a test load on the helical pile 10. The downward test load is exerted on the test pile 10, and counteracting upward load is transmitted through the head assembly 30 as tensile loads carried by the anchor piles 20 to the ground. Download movement of the test pile 10 can then be measured by the measurement device 50 via the vertical member 56.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A system for field testing the bearing behavior of a test helical pile that has been driven into the ground with an upper end of the test helical pile remaining exposed, said system comprising:
    a plurality of anchor helical piles driven into the ground at angles around the test helical pile, with the upper ends of the anchor helical piles converging toward a region above the upper end of the test helical pile;
    a head assembly having:
    (a) attachments for engaging the upper ends of the anchor helical piles to form a support structure over the upper end of the test helical pile; and
    (b) a vertical passageway extending through the head assembly;
    a hollow-core hydraulic jack between the upper end of the test helical pile and the head assembly to exert a test load on the test helical pile, said jack having a vertical passageway aligned with the test helical pile and the vertical passageway of the head assembly; and
    a vertical member extending through the vertical passageways in the head assembly and jack to the upper end of the test helical pile for measuring movement of the test helical pile in response to the test load applied by the jack.

2. The system of claim 1 wherein the vertical member measures movement of the test helical pile relative to a horizontal reference beam.

3. The system of claim 1 wherein the upper ends of the anchor helical piles are threaded, and wherein the attachments of the head assembly comprise threaded socket couplers for engaging the upper ends of the anchor helical piles.

4. The system of claim 1 wherein the plurality of anchor helical piles comprises at least three anchor helical piles.

5. The system of claim 1 wherein the anchor helical piles and head assembly form a tripod over the test helical pile.

6. A method for field testing the bearing behavior of a test helical pile comprising:
    driving the test helical pile into the ground with the upper end of the test helical pile remaining exposed;
    driving a plurality of anchor helical piles into the ground at angles around the test helical pile, with the upper ends of the anchor helical piles converging toward a region above the upper end of the test helical pile;

providing a head assembly having:
(a) attachments for engaging the upper ends of the anchor helical piles; and
(b) a vertical passageway extending through the head assembly;

securing the attachments of the head assembly to the upper ends of the anchor helical piles to form a support structure over the upper end of the test helical pile;

providing a hollow-core hydraulic jack between the upper end of the test helical pile and the head assembly, said jack having a vertical passageway aligned with the test helical pile and the vertical passageway of the head assembly;

actuating the jack to exert a test load on the test helical pile; and measuring movement of the upper end of the test helical pile in response to the test load applied by the jack through the vertical passageways of the head assembly and jack.

7. The method of claim 6 wherein movement of the upper end of the test helical pile is measured by:

placing a vertical member through the vertical passageways of the head assembly and jack to contact the upper end of the test helical pile;

mounting a horizontal reference beam adjacent to the vertical member; and measuring the resulting movement of the vertical member relative to the horizontal reference beam in response to the test load.

8. The method of claim 6 wherein the anchor helical piles and head assembly form a tripod over the test helical pile.

9. A system for field testing the bearing behavior of a test helical pile that has been driven into the ground with an upper end of the test helical pile remaining exposed, said system comprising:

a plurality of anchor helical piles driven into the ground at angles around the test helical pile, with threaded upper ends of the anchor helical piles converging toward a region above the upper end of the test helical pile;

a head assembly having:
(a) a vertical passageway extending through the head assembly; and
(b) threaded sockets extending at angles outward and downwards from the vertical passageway for engaging the upper ends of the anchor helical piles to form a support structure over the upper end of the test helical pile;

a hollow-core hydraulic jack between the upper end of the test helical pile and the head assembly to exert a test load on the test helical pile, said jack having a vertical passageway aligned with the test helical pile and the vertical passageway of the head assembly; and a vertical member extending through the vertical passageways in the head assembly and jack to the upper end of the test helical pile for measuring movement of the test helical pile in response to the test load applied by the jack.

10. The system of claim 9 wherein the vertical member measures movement of the test helical pile relative to a horizontal reference beam.

11. The system of claim 9 wherein the anchor helical piles and head assembly form a tripod over the test helical pile.

\* \* \* \* \*